Jan. 27, 1931.  R. M. URQUHART  1,790,125
METHOD OF AND APPARATUS FOR PRODUCING FIRE EXTINGUISHING FOAM
Filed Oct. 26, 1925
Fig. 1,
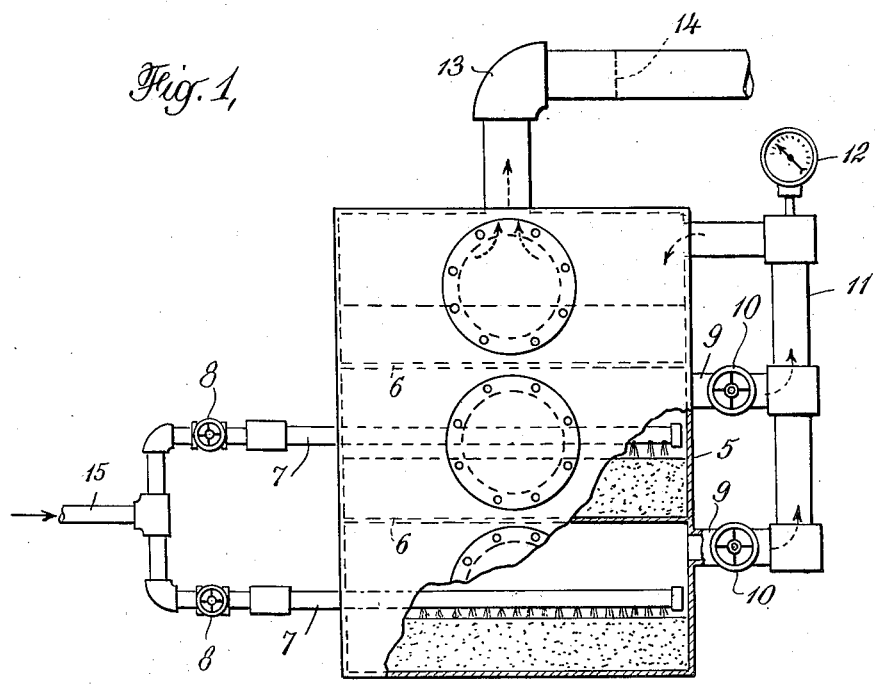
Fig. 2,
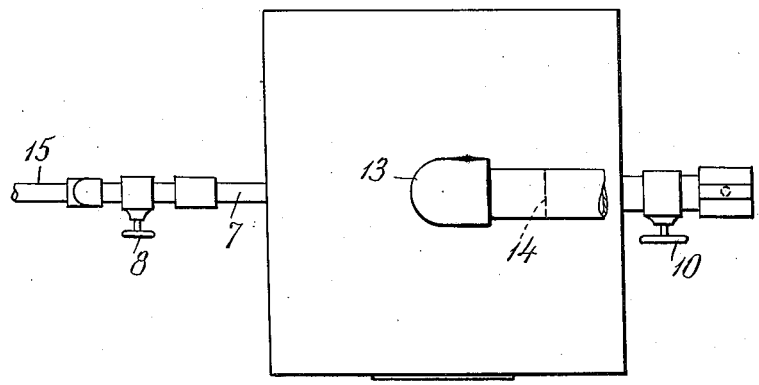
INVENTOR
Radcliffe Morris Urquhart
BY
Pennie, Davis, Marvin & Edmonds
ATTORNEY Patented Jan. 27, 1931

1,790,125

UNITED STATES PATENT OFFICE

RADCLIFFE MORRIS URQUHART, OF NEW YORK, N. Y., ASSIGNOR TO AMDYCO CORPORATION, OF NEW YORK, N. Y., A CORPORATION OF NEW YORK

METHOD OF AND APPARATUS FOR PRODUCING FIRE-EXTINGUISHING FOAM

Application filed October 26, 1925. Serial No. 64,733.

This invention relates to a method of and apparatus for extinguishing fires, and particularly to improvements in the production of fire-extinguishing foam.

The use of foam for extinguishing fires is well known. One method for the production of the foam heretofore has depended upon the maintenance of two separate solutions and the preparation of three solutions, two of which are mixed prior to the fire. Thus, in common practice a solution of sodium bicarbonate is prepared by dissolving the salt in water and a solution of aluminum sulphate is prepared similarly. A stabilizer consisting usually of an extract of licorice root in liquid form is diluted with water and added to one of the previously mentioned solutions, usually that containing sodium bicarbonate. The two solutions are maintained in separate tanks and are delivered therefrom by means of pumps which force the two solutions together and form the foam before it is delivered to the surface of the burning material. This system requires frequent inspection of the solutions and the maintenance of the tanks and pumps and is relatively costly.

It is the object of the present invention to provide a simple method of and apparatus which is adapted to produce foam and which avoids the necessity of maintaining large tanks containing considerable volumes of solution. By the use of the apparatus hereinafter described the cost of maintenance and inspection of the equipment is greatly reduced and the production of a stable foam of the desired character is assured.

Further objects and advantages of the invention will be apparent as it is better understood by reference to the following specification and accompanying drawing, in which Fig. 1 is a vertical section through a foam generator adapted for use in carrying out the invention; and Fig. 2 is a plan view thereof.

The invention depends upon the use of a dry material containing the necessary ingredients to produce foam when water is added thereto. This dry material can be disposed in a suitable closed receptacle so that it will be unaffected by atmospheric conditions, and provision can be made for the introduction of water when foam is required. The water will be distributed over the surface of the solid material and sufficient pressure will be developed by the foam thus produced so as to eject the foam and to permit its application to the surface of the burning material.

The dry foam-forming material may contain any of the usual ingredients which are capable of reacting to produce carbon dioxide in considerable volume, together with any suitable stabilizer. Preferably sodium bicarbonate and aluminum sulphate are used because these materials are inexpensive and are available in large quantities in the market. Other bicarbonates and salts which have an acid reaction in the presence of water can be substituted. For the stabilizer I prefer to use an extract of oak bark but other materials such as an extract of licorice root can be substituted.

The composition comprises all of the necessary ingredients to produce foam combined in the mixture, the several ingredients of which are dry and thus incapable of reacting. The ingredients are not deliquescent to any marked extent and can be preserved, therefore, in a dry condition almost indefinitely.

Sodium bicarbonate and aluminum sulphate in a dry and pulverulent condition can be obtained readily in the market. The stabilizer is prepared by evaporating the extract which is usually prepared and sold in liquid form. Extract of oak bark and of licorice root is now available in the market and when evaporated in suitable vacuum pans it will crystallize and the crystals can be dried in any suitable apparatus such as a drum drier. This dry extract can be used in the composition.

A typical composition adapted for use in carrying out the invention includes the following:

| | Parts |
|---|---|
| Dry bicarbonate of soda | 28 |
| Dry aluminum sulphate | 33 |
| Dry extract of black oak bark | 5 |

This mixture can be packed in a dry condition and in quantity sufficient to form a charge for the apparatus. Thus, a package containing 100 pounds of the composition is intended to be employed with 100 gallons of water. With an apparatus of given capacity and a suitable source of water supply, it is possible to produce a foam blanket of predetermined dimensions.

The apparatus employed may be varied somewhat in form, but the type illustrated in the drawing is well adapted to accomplish the purpose. It comprises a receptacle 5 which is divided preferably by partitions 6 into a plurality of compartments. In each of the compartments a charge of the dry foam-forming material is disposed and pipes 7 are arranged to deliver water to some of the compartments. The pipes should be provided with a plurality of small openings within the compartments so as to direct the water in fine streams over the surface of the powdered foam-forming material. Preferably two compartments are supplied with water while the third is utilized as a drying compartment to absorb any water which may be carried over by the foam from the other compartments. Valves 8 can be disposed in the pipes 7 so that water can be delivered to either or both of the compartments in which the foam is formed. The foam is delivered from the compartments through outlet pipes 9 controlled by valves 10 and passes through a header 11 which is preferably supplied with a pressure gauge 12 into the drying compartment where no water is supplied. In passing through the drying compartment any surplus water is converted into foam by contact with the dry foam-forming material therein and the foam is ejected through an outlet pipe 13. This pipe may have a diaphragm 14 of some suitable material such as paper which is adapted to be ruptured by the pressure but which, nevertheless, prevents deterioration of the contents of the apparatus through exposure to the atmosphere. The water inlet pipe 15 supplies water to the pipes 7. The foam being thus generated automatically, will be forced past the diaphragm 14 and will be delivered to suitable pipes provided for that purpose to the surface of the burning material.

From the foregoing it will be observed that contrary to the usual practice it is unnecessary to maintain large bodies of solutions. The water which is used in making the foam is delivered from any usual source thereof and is supplied only at the time when the foam is to be generated. While the apparatus is inactive the chemical constituents are preserved from deterioration and are maintained constantly in a condition to facilitate the production of foam under the best possible conditions when the foam is needed for fire-extinguishing purposes.

As herein indicated, the particular ingredients mentioned are not essential to the practice of the invention and the apparatus can be modified in many details without departing from the invention or sacrificing any of the advantages thereof.

I claim:—

1. The method of producing foam for fire-extinguishing use, which comprises maintaining a body of dry material containing foam-forming and stabilizing ingredients within a closed chamber, distributing water in the chamber upon the surface of the material, withdrawing the foam formed in the chamber, drying the foam, and directing it upon the surface of burning material.

2. The method of producing foam for fire-extinguishing use, which comprises maintaining a body of dry material containing foam-forming and stabilizing ingredients within a closed chamber, controlling a supply of water to be delivered to the chamber when a fire occurs, distributing water in the chamber upon the surface of the material, withdrawing the foam formed in the chamber, drying the foam, and directing it upon the surface of burning material.

3. In an apparatus for producing foam for fire-extinguishing use, the combination of a receptacle having a plurality of chambers to receive a supply of material containing foam-forming and stabilizing ingredients, means for distributing water from an external source of supply over the surface of the materials in one or more of the chambers and means for withdrawing and directing a stream of foam formed in the chambers, the withdrawing means including a chamber containing a supply of the foam-forming and stabilizing material to dry the foam.

4. In an apparatus for producing foam for fire-extinguishing use, the combination of a receptacle having a plurality of chambers to receive a supply of material containing foam-forming and stabilizing ingredients, pipes in the chambers above the material with openings adapted to distribute water on the surface of the material, means connecting the pipes to an external source of water, means for controlling the supply of water to the pipes, means for drying the foam formed in the chambers, and means for withdrawing and directing a stream of foam.

In testimony whereof I affix my signature.
RADCLIFFE MORRIS URQUHART.